United States Patent
Fincannon et al.

(10) Patent No.: US 12,425,713 B2
(45) Date of Patent: Sep. 23, 2025

(54) IMAGING SYSTEM WITH OBJECT RECOGNITION FEEDBACK

(71) Applicant: MOTOROLA SOLUTIONS, INC., Chicago, IL (US)

(72) Inventors: William Fincannon, Allen, TX (US); Joseph Rafferty, Corona, CA (US); Pietro Russo, Melrose, MA (US); Peter L. Venetianer, McLean, VA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 165 days.

(21) Appl. No.: 18/366,446

(22) Filed: Aug. 7, 2023

(65) Prior Publication Data

US 2025/0056111 A1 Feb. 13, 2025

(51) Int. Cl.
*H04N 23/61* (2023.01)
*G06V 20/62* (2022.01)
*G06V 30/10* (2022.01)

(52) U.S. Cl.
CPC .......... *H04N 23/61* (2023.01); *G06V 20/625* (2022.01); *G06V 30/10* (2022.01)

(58) Field of Classification Search
None
See application file for complete search history.

(56) References Cited

U.S. PATENT DOCUMENTS

| | | | |
|---|---|---|---|
| 9,092,979 B2 | 7/2015 | Burry et al. | |
| 9,317,764 B2 | 4/2016 | Baheti et al. | |
| 9,465,774 B2 | 10/2016 | Maison | |
| 9,536,292 B2 | 1/2017 | Afrooze et al. | |
| 10,108,883 B2 | 10/2018 | Becker et al. | |
| 10,558,856 B1 | 2/2020 | Yellapragada et al. | |
| 11,303,801 B2 * | 4/2022 | Chen | H04N 23/661 |
| 11,651,601 B1 | 5/2023 | Young | |
| 2010/0141758 A1 | 6/2010 | Kim et al. | |

(Continued)

FOREIGN PATENT DOCUMENTS

CN 106781675 B 6/2022

OTHER PUBLICATIONS

International Search Report and Written Opinion for Application No. PCT/US2024/040170 dated Nov. 15, 2024 (18 pages).

*Primary Examiner* — Cynthia Segura
(74) *Attorney, Agent, or Firm* — Michael Best & Friedrich LLP (57) ABSTRACT

Examples provide an imaging system including an image sensor; and an electronic processor in communication with the image sensor. The electronic processor is configured to determine a set of imaging parameters, and, for each iteration included in an iteration set, update the set of imaging parameters by: receiving an image captured by the image sensor using the set of imaging parameters, performing object recognition on the image to detect an object of interest, determining an object recognition confidence score, determining a set of external factors based on the image and/or information from a second sensor, linking the set of imaging parameters and the set of external factors to the object recognition confidence score, and training a predictive model for updating the set of imaging parameters using the object recognition confidence score, the set of imaging parameters, and the set of external factors.

20 Claims, 5 Drawing Sheets

(56) References Cited

U.S. PATENT DOCUMENTS

| | | | |
|---|---|---|---|
| 2014/0355835 A1* | 12/2014 | Rodriguez-Serrano | G06V 30/2272 |
| | | | 382/105 |
| 2019/0095730 A1* | 3/2019 | Fu | G06V 10/764 |
| 2019/0130545 A1* | 5/2019 | Cardei | H04N 23/70 |
| 2021/0092280 A1* | 3/2021 | Nishimura | G06N 3/04 |
| 2022/0067394 A1* | 3/2022 | Suksi | G08G 1/0175 |
| 2022/0108427 A1* | 4/2022 | Kim | G06V 10/993 |
| 2022/0171981 A1* | 6/2022 | Georgis | G06V 20/63 |
| 2023/0049184 A1* | 2/2023 | Alakarhu | B60S 1/04 |
| 2023/0386193 A1* | 11/2023 | Lee | H04N 23/80 |
| 2024/0046426 A1* | 2/2024 | Jung | H04N 7/188 |
| 2024/0048672 A1* | 2/2024 | Jung | H04N 23/61 |
| 2024/0331094 A1* | 10/2024 | Pouyanfar | G06T 5/70 |
| 2025/0016438 A1* | 1/2025 | Eki | H04N 23/66 |
| 2025/0131767 A1* | 4/2025 | Saito | G06V 40/174 |

\* cited by examiner

IMAGING SYSTEM WITH OBJECT RECOGNITION FEEDBACK

BACKGROUND

Accuracy of object recognition performed by cameras is affected by the imaging parameters of the camera, such as, for example, shutter speed, aperture, illumination, focus, and the like.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments, examples, aspects, and features.

The apparatus and method components have been represented where appropriate by conventional symbols in the drawings, showing only those specific details that are pertinent to understanding the embodiments, examples, aspects, and features described and illustrated so as not to obscure the disclosure with details that will be readily apparent to those of ordinary skill in the art having the benefit of the description herein.

DETAILED DESCRIPTION

Auto-focus and auto-aperture algorithms in traditional security systems may be suitable for capturing images of an overall scene. However, many object recognition engines, for example, license plate recognition ("LPR") engines, require higher focus and contrast than that of traditional security footage in order to achieve recognition accuracy. In captured images, license plates or other targets of object recognition engines (e.g., people, signage, etc.) often occupy only a small region of a captured image. Therefore, focus and contrast requirements for object recognition engines are very high for that small region of the image. In traffic scenarios, that small region of the image is often continuously moving (e.g., as a vehicle travels down a roadway).

Object recognition often includes identifying details associated with the target object. For example, LPR includes recognition of a license plate number and/or a state or region associated with the license plate. Optimal focus, exposure and other settings are needed to achieve the high accuracy in LPR. Additionally, illumination on highly reflective objects (e.g., license plates or other signage) often results in overexposure of the object in the captured image. Therefore, exposure settings, particularly at night, must be tightly controlled.

Thus, there is a need for an enhanced imaging system with object recognition engine feedback. One example provides an imaging system including an image sensor and an electronic processor in communication with the image sensor. The electronic processor is configured to determine a set of imaging parameters, and, for each iteration included in an iteration set, update the set of imaging parameters by: receiving an image captured by the image sensor using the set of imaging parameters, performing object recognition on the image to detect an object of interest; determining an object recognition confidence score, determining a set of external factors based on the image and/or information from a second sensor, linking the set of imaging parameters and the set of external factors to the object recognition confidence score, and training a predictive model for updating the set of imaging parameters using the object recognition confidence score, the set of imaging parameters, and the set of external factors.

In some aspects, the iteration set includes a plurality of iteration subsets, and the electronic processor is configured to, for each iteration subset, determine a selected imaging parameter to update, and update the selected imaging parameter based on the object recognition confidence score.

In some aspects, the electronic processor is configured to determine the selected imaging parameter using the predictive model.

In some aspects, the electronic processor is configured to determine a number of iterations included in each iteration subset using the predictive model.

In some aspects, the set of imaging parameters includes at least one selected from the group consisting of: aperture settings, shutter speed settings, focus settings, illumination settings, image capture timing settings, and lens cleaning settings.

In some aspects, the set of external factors include at least one selected from the group consisting of: ambient light information, a speed of the object of interest, a weather condition, a reflectivity of the object of interest, a location of the object of interest in the image, and a speed of the object of interest.

In some aspects, the object of interest is a license plate, and performing object recognition includes at least one selected from the group consisting of: detecting a location of the license plate in the image, performing optical character recognition ("OCR") on a set of characters included in the license plate, and determining a state or region associated with the license plate.

In some aspects, the electronic processor is configured to determine the set of imaging parameters using the predictive model.

In some aspects, the electronic processor is configured to determine the set of imaging parameters using automatic camera tuning.

Another example provides a method performed in an imaging system. The method includes determining a set of imaging parameters, and for each iteration included in an iteration set, updating the set of imaging parameters by: receiving an image captured by an image sensor using the set of imaging parameters, performing object recognition on the image to detect an object of interest, determining an object recognition confidence score, determining a set of external factors based on the image and/or information from a second sensor, linking the set of imaging parameters and the set of external factors to the object recognition confidence score, and training a predictive model for updating the set of imaging parameters using the object recognition confidence score, the set of imaging parameters, and the set of external factors.

In some aspects, the iteration set includes a plurality of iteration subsets, and the method further includes, for each iteration subset, determining a selected imaging parameter to update, and updating the selected imaging parameter based on the object recognition confidence score.

In some aspects, the selected imaging parameter is determined using the predictive model.

In some aspects, the method further includes determining a number of iterations included in each iteration subset using the predictive model.

In some aspects, the set of imaging parameters includes at least one selected from the group consisting of: aperture settings, shutter speed settings, focus settings, illumination settings, image capture timing settings, and lens cleaning settings.

In some aspects, the set of external factors include at least one selected from the group consisting of: ambient light information, a speed of the object of interest, a weather condition, a reflectivity of the object of interest, a location of the object of interest in the image, and a speed of the object of interest.

In some aspects, the object of interest is a license plate, and performing object recognition includes at least one selected from the group consisting of: detecting a location of the license plate in the image, performing optical character recognition ("OCR") on a set of characters included in the license plate, and determining a state or region associated with the license plate.

In some aspects, the set of imaging parameters is determined using the predictive model.

In some aspects, the set of imaging parameters is determined using automatic camera tuning.

Another example provides a non-transitory computer readable medium storing a program that, when executed by an electronic processor, causes the electronic processor to perform a set of operations including determining a set of imaging parameters, and for each iteration included in an iteration set, updating the set of imaging parameters by: receiving an image captured by an image sensor using the set of imaging parameters, performing object recognition on the image to detect an object of interest, determining an object recognition confidence score, determining a set of external factors based on the image and/or information from a second sensor, linking the set of imaging parameters and the set of external factors to the object recognition confidence score, and training a predictive model for updating the set of imaging parameters using the object recognition confidence score, the set of imaging parameters, and the set of external factors.

In some aspects, the set of imaging parameters includes at least one selected from the group consisting of: aperture settings, shutter speed settings, focus settings, illumination settings, image capture timing settings, and lens cleaning settings.

Figure 1:
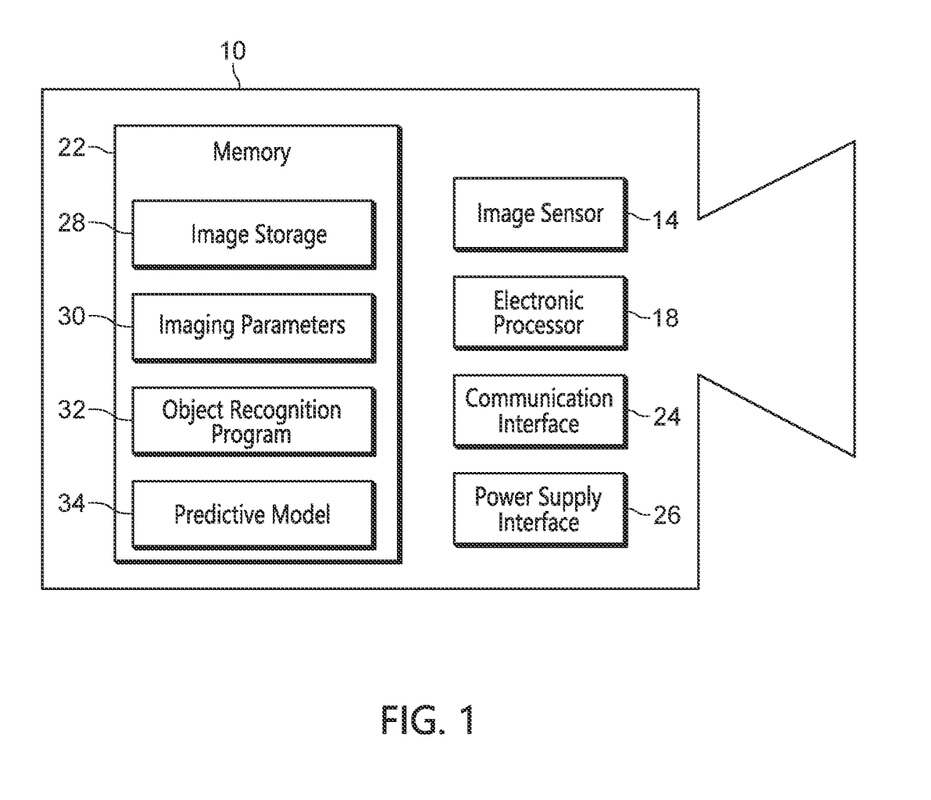
FIG. 1 schematically illustrates a camera, according to some aspects.

FIG. 1 schematically illustrates an imaging device 10, according to some examples. The imaging device 10 is, for example, a camera including an image sensor 14 for capturing a plurality of images (e.g., a plurality of images included in a video). The imaging device 10 may be a digital imaging device or an analog imaging device. The image sensor 14 may be operable to capture light within the visible light frequency range and/or outside of the visible light frequency range (e.g., infrared or ultraviolet light). In some instances, the image sensor 14 includes multiple image sensors 14 operable to capture light in different frequency ranges. In some instances, the imaging device 10 includes at least two image sensors 14.

The imaging device 10 also includes an electronic processor 18 (for example, a microprocessor or other electronic device). The electronic processor 18 is electrically coupled to the image sensor 14, a memory 22, a communication interface 24, and a power supply interface 26. The electronic processor 18 includes suitable processing circuitry for performing the methods described herein or any combination of suitable processing circuitry. For example, the electronic processor 18 may include a digital signal processor (DSP), a graphics processing unit (GPU) embedded processor, a vision processing unit, etc. One or more circuit units included in the electronic processor 18 may operate independently or in parallel with one another.

In the example shown, the memory 22 stores data and computer program instructions for performing, among other things, the methods described herein. For example, the memory 22 includes image storage 28 for storing images captured by the image sensor 14, a set of imaging parameters 30 used for capturing an image with the image sensor 14, an object recognition program 32 executable by the electronic processor 18 for identifying objects of interest in captured images, and a predictive model 34 for predicting and modifying the imaging parameters 30. The imaging parameters 30 may include, for example, aperture settings, shutter speed settings, focus settings, illumination settings, image capture timing settings, lens cleaning settings, and/or the like. In some instances, the set of imaging parameters 30 are metadata associated with a captured image. The memory 22 may include read only memory (ROM), random access memory (RAM), other non-transitory computer-readable media, or a combination thereof.

The imaging device 10 is operable to send and receive data, such as a video stream, video analytics data, parameter information, and/or commands to one or more external devices using the communication interface 24. In some instances, the object recognition program 32 is stored external to the imaging device 10, and the imaging parameters 30 are transmitted to the memory 22 via the communication interface 24.

The power supply interface 26 provides the imaging device 10 a connection to a power source. In some instances, the imaging device 10 is a fixed wired imaging device (e.g., mounted on a stoplight or other street infrastructure), and the power supply interface 26 connects the imaging device to a wired power source (for example, power supplied by a utility company). In some instances, the imaging device 10 is a battery-powered imaging device, and the power supply interface 26 is connectable to an internal and/or external battery (or battery pack) to power the imaging device 10. In some instances, the imaging device 10 is a solar-powered or at least partially solar-powered imaging device. In some instances, the imaging device 10 is a vehicle mounted imaging device, and the power supply interface 26 is connects the imaging device 10 to a power source of the vehicle. The imaging device 10 may include additional components other than those described with respect to FIG. 1. The imaging device 10 may alternatively be referred to herein as the camera 10.

Figure 2:
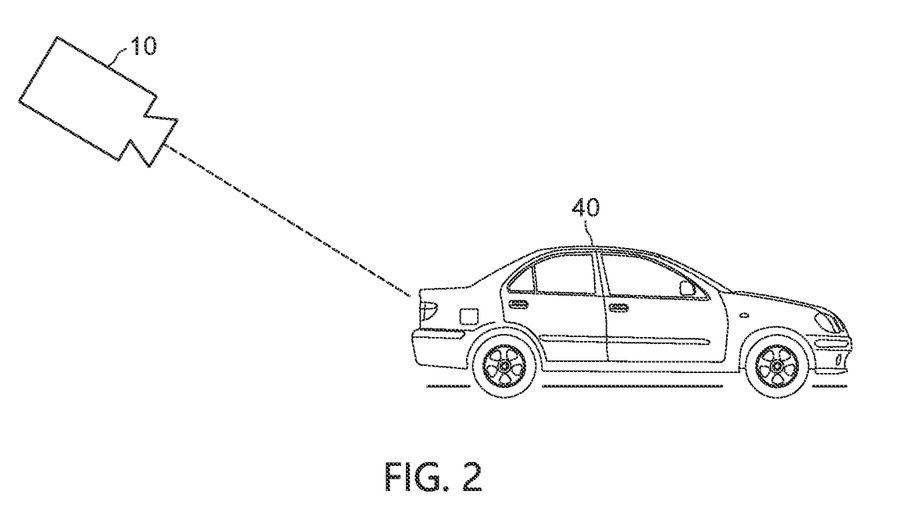
FIG. 2 illustrates a camera arranged to capture an image of an object of interest, according to some aspects.

Referring now to FIG. 2, the camera 10 may be arranged such that one or more objects, such as target vehicle 40, passes through the field of view of the camera 10. For example, in some instances, the camera 10 is a stationary camera and mounted to street infrastructure, such as, for example, a stoplight, a streetlight, a road sign, an access controlled point, a bridge, an entrance or exit of a toll road, a highway, or the like. When the camera 10 is an infrastructure-mounted camera 10, objects of interest in the field of view of the camera may appear in generally the same location, or set of locations, of the captured images. For example, when the camera 10 is mounted at a stoplight of an intersection, vehicles, such as the target vehicle 40, may pass through the field of view of the camera 10 along substantially similar paths to one another, and therefore objects of interest may appear in similar locations in captured images. However, speed of vehicles passing through the field of view may vary.

In some instances, the camera 10 is a moving camera mounted to, for example, a base vehicle. The camera 10 may be arranged on a base vehicle such that target vehicles 40 are in approximately the same location or locations within the field of view of the camera. For example, the camera 10 may be arranged at the front of the base vehicle such that the rear end of target vehicles 40 are generally directly in front of the camera 10. However, the camera 10 may be arranged at other locations of base vehicle, such as, for example, the side of a base vehicle or the rear of a base vehicle.

Figure 3:
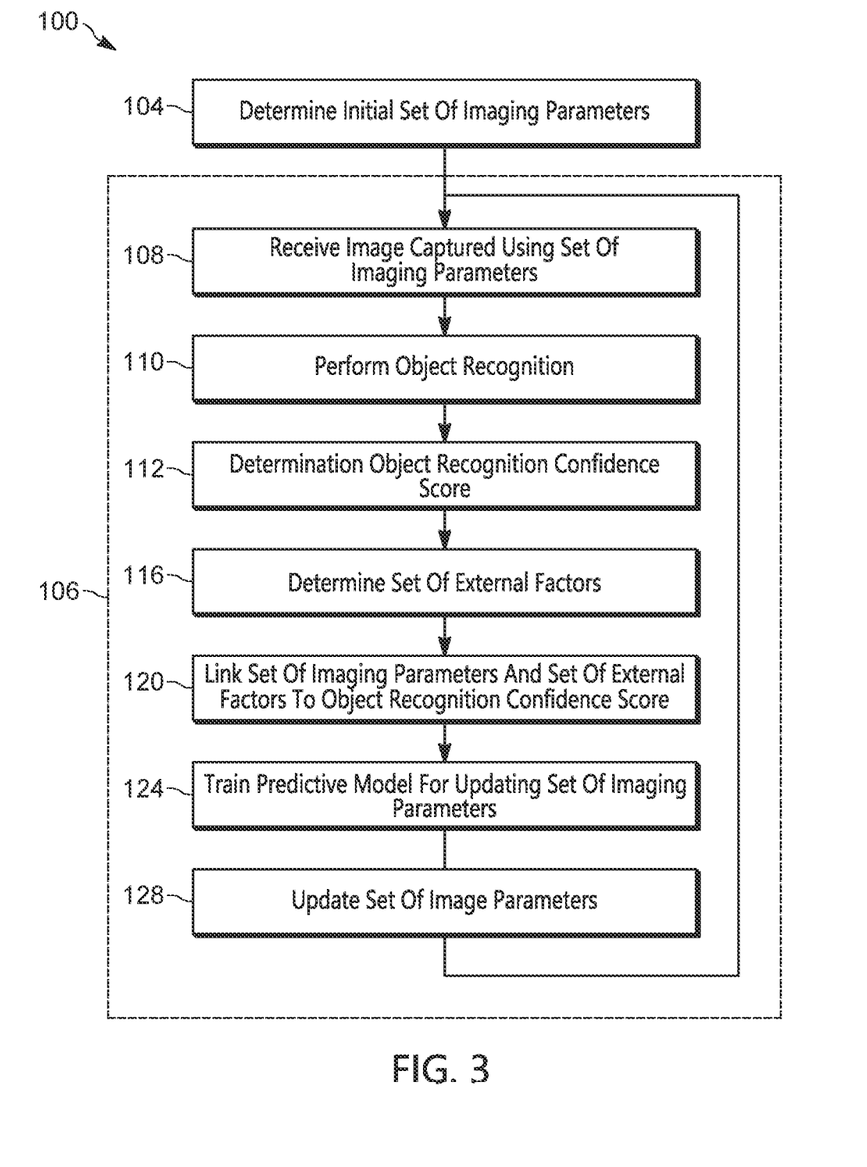
FIG. 3 illustrates a method for updating a set of imaging parameters for performing object recognition on a captured image.

The power source of the camera 10, the arrangement of the camera 10 relative to objects of interest (e.g., target vehicle 40 or a portion of target vehicle 40), the type of object of interest, and other external factors affect the clarity of images captured using the camera 10 and the imaging parameters 30 needed to capture images with clear objects of interest. Therefore, FIG. 3 illustrates a method 100 for updating a set of imaging parameters 30 for performing object recognition on a captured image.

The method 100 includes determining a set of imaging parameters 30 (at block 104). The electronic processor 18 may initially determine the set of imaging parameters 30 using, for example, known camera tuning methods. For example, the electronic processor 18 may automatically set an exposure, a shutter speed, an aperture, a flash, or the like using, for example, a light sensor included in the camera 10. After determining the initial set of parameters, the electronic processor 18 iteratively updates the set of imaging parameters 30 for each iteration in an iteration set (at loop 106).

After the camera 10 captures, with the image sensor 14, an image, the electronic processor 18 receives the captured image (at block 108). The image may include an object of interest. Then electronic processor 18 performs object recognition (e.g., using the object recognition program 32) on the image to detect an object of interest (at block 110). The object of interest may be, for example, a license plate on a vehicle, a person (e.g., a driver of a vehicle visible through an open or at least substantially transparent window or windshield, a passenger of a vehicle visible through an open or at least substantially transparent window or windshield, a cyclist, a motorcyclist, a pedestrian, etc.), identification of a number of people in a vehicle, signage, a make and/or model of a vehicle, or the like. The electronic processor 18 may be configured by a user to detect a predetermined type of object of interest. The object recognition may include detecting a location of the object of interest in the image, performing optical character recognition ("OCR") on a set of characters included in the object of interest (e.g., in instances where the object of interest is a license plate or other signage), performing facial recognition on the object of interest (e.g., in instances where the object of interest is a person), and/or determining one or more additional identifying features of the object of interest.

Each type of object of interest may be affected differently by the imaging parameters 30 of the camera 10. For example, because human skin is less reflective than a license plate, the effects of illumination (e.g., camera flash) on a license plate may be greater than on a person, and may negatively impact the clarity of the object of interest in the image. As a result, the automatic imaging parameters 30 (set, for example, at block 104) may not be ideal for recognizing the particular object of interest. Additionally, other external factors, such as ambient light information, a speed of the object of interest relative to the camera 10, a location of the object of interest in the image, weather conditions, time of day, or the like may affect the clarity of the object of interest in the image. Therefore, the electronic processor 18 determines an object recognition confidence score for the object of interest (at block 112). The object recognition confidence score indicates a confidence and/or correctness of the electronic processor 18 in the result of the object recognition. For example, when the object of interest is a license plate, the object recognition confidence score may indicate a confidence level in a determination of the license plate number, a state or region to which the license plate is registered, an expiration date of the license plate, or the like.

The electronic processor 18 also determines a set of external factors associated with the image (at block 116). As described above, the set of external factors may include, ambient light information, a speed of the object of interest relative to the camera 10, a reflectivity of the object of interest, a location of the object of interest, weather conditions (e.g., rain, snow, fog, etc.), time of day, and the like. The electronic processor 18 may determine the set of external factors based on the captured image and/or using one or more sensors included in the camera 10 or communicatively connected to the camera 10. For example, the electronic processor 18 may determine a speed of the object of interest relative to the camera 10 using a lidar and/or radar sensor, or determine weather conditions from weather data received via the communication interface 24 over a network (e.g., from an online weather service).

The electronic processor 18 may determine the set of external factors before, in conjunction with, or after performing object recognition (at block 110). For example, the electronic processor 18 may determine a weather condition, such as snow, using the object recognition program.

The electronic processor 18 links the set of imaging parameters 30 used to capture the image and the set of external factors to the object recognition confidence score, and stores the set of imaging parameters 30, the set of external factors, and the object recognition score in the memory 22 (at block 120). For example, the electronic processor 18 stores the confidence score as a mapping or function (e.g., a cost function) of the imaging parameters 30 and the set of external factors. In some instances, the electronic processor 18 also stores the image captured using the set of imaging parameters 30. In some instances, the electronic processor 18 only stores a portion of the imaging parameters 30, a portion of the external factors, or a portion of the image (e.g., a portion of the image including the object of interest).

The electronic processor 18 uses the comparison, the set of imaging parameters 30, the set of external factors, the object recognition confidence score, and/or the captured image to train a predictive model 34 for updating the set of imaging parameters 30 (at block 124). The predictive model 34 may be a suitable predictive model 34 (e.g., an artificial intelligence model, such as a convolutional neural network ("CNN")), for updating the imaging parameters 30. The predictive model 34 is trained to determine, for a given a set of imaging parameters (otherwise referred to herein as "tuning parameters") and a set of external factors, which adjustment in the tuning parameters results in the largest gain in the object recognition score. The predictive model 34 may undergo a minimum predefined training period. For example, the predictive model 34 may be trained for a minimum of at least 12 hours, 24 hours, one week, one month, or the like. In some instances, the electronic processor 18 determines the length of the training period based on time (e.g., a threshold training period), imaging conditions (e.g., a threshold variety of the external factors), a threshold number of times object recognition is performed, and/or the like. However, the predictive model 34 may continue to be trained during operation of the camera 10. For example, for a camera 10 installed during the summer time, the predictive model 34 is trained using summer conditions, and the predictive model 34 continues to be trained as environmental conditions shift according to the change in seasons. In this manner, the predictive model 34 may adjust according to local external factors where the camera operates, such as, for example, typical vehicle speeds, lighting conditions, and the like.

Using the predictive model 34, the electronic processor 18 updates one or more of the imaging parameter in order to improve the object recognition score at a subsequent iteration of the loop 102 (at block 128). For example, the electronic processor 18 may determine, using the predictive model 34, that an illumination setting of the camera is too high or too low, or that a focus setting of the camera should be adjusted. In some instances, the electronic processor 18 determines, using the predictive model 34, an optimal or improved set of imaging parameters 30 for a particular time of day, time of year, and/or weather condition. After updating the set of imaging parameters 30, the electronic processor 18 may repeat the steps of the loop 102 for a subsequent iteration.

In some instances, the electronic processor 18 determines the number of iterations included in the iteration set of the loop 102 using the predictive model 34. However, in some instances, the number of iterations included in the iteration set is constrained by, for example, a fps setting of the camera 10 or the power source of the camera 10. For example, when the camera 10 is a battery powered camera, the iteration set may include fewer iterations than when the camera 10 is a wired camera.

In some instances, the electronic processor 18 updates, using the predictive model 34, one imaging parameter for each iteration of the iteration set. In such instances, at each iteration of the loop 102, the predictive model 34 may select one parameter from the set of imaging parameters 30, and output an updated value for the selected imaging parameter. For example, at a first iteration, the electronic processor 18 may update an illumination setting using the predictive model 34. At a second iteration, the electronic processor 18 may update a focus setting using the predictive model 34. The number of imaging parameters 30 updated and the order of updates may be predetermined, user-selected, or determined using the predictive model 34. For example, the predictive model 34 may generate, using the captured image, a priority list of the imaging parameters 30, and iteratively update the imaging parameters 30 according to the priority list.

In some instances, for example when the camera 10 is a high frame per second (fps) camera, the iteration set includes a plurality of iteration subsets, and, for each iteration subset, the electronic processor 18 updates a selected imaging parameter using the predictive model 34. For example, using the predictive model 34, the electronic processor 18 may update a first parameter for a first iteration subset, update a second parameter for a second iteration subset, update a third parameter for a third iteration subset, etc. The number of iterations included in each iteration subset may vary. For example, the electronic processor 18 may iteratively update the selected parameter until the predictive model 34 indicates that the update for the parameter is complete, and/or until the object recognition confidence score has reached a threshold score. In some instances, the number of iterations included in each iteration subset and/or the order of the iteration subsets is predetermined, user-selected, or determined using the predictive model 34.

While the method 100 is described above with a particular number of steps and in a particular order, the number of steps and the order of the steps may vary. Additionally, in some instances, the electronic processor 18 uses the trained predictive model 34 to determine the initial set of imaging parameters 30 (at block 104) in lieu of, or in conjunction with traditional camera tuning techniques.

While the method 100 is described above with respect to step 128 as updating only one imaging parameter per iteration of the loop 106, in some instances, the electronic processor 18 updates more than one parameter (at step 128) for each iteration of the loop 106. In some instances, all of the imaging parameters 30, a predetermined number of imaging parameters 30, or a number of imaging parameters 30 selected using the predictive model 34 are updated.

Figure 4:
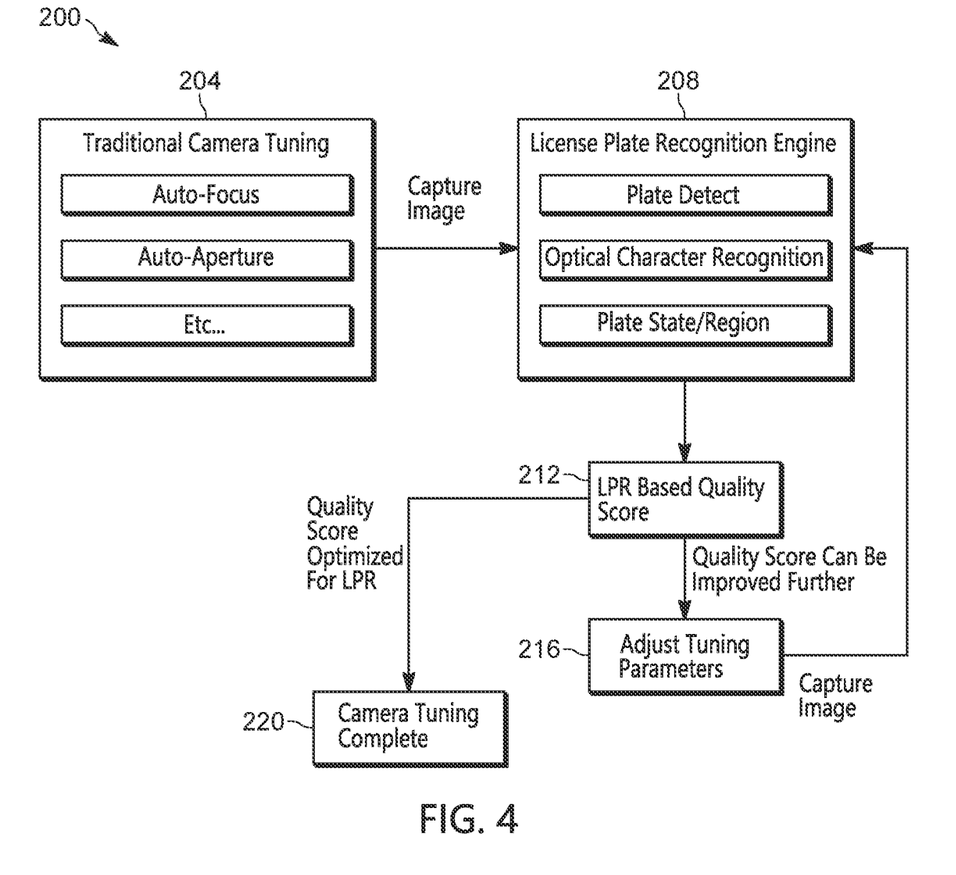
FIG. 4 illustrates a method for updating a set of imaging parameters for performing license plate recognition on a captured image.

FIG. 4 illustrates an example use-case method 200 for updating a set of imaging parameters 30 for performing license plate recognition on a captured image. Although an example of license plate recognition is described, the principles and techniques described may be applied to other object recognition and machine vision applications. In the example provided, the method 200 includes performing traditional camera tuning of the imaging parameters 30 (at block 204). The traditional camera tuning may include performing, for example, auto-focus, auto-aperture, and the like according to the environment in the field of view of the camera 10. Using the imaging parameters 30, the camera 10 captures an image, and the electronic processor 18 performs a license plate recognition ("LPR") on the image using, for example, the object recognition program 32 (otherwise referred to herein as the LPR engine 32) (at block 208). The LPR engine may detect the location of the license plate within the image, perform optical character recognition on the portion of the image including the license plate, and/or identify a state or region associated with the license plate. Using the results of the LPR, the electronic processor 18 determines a LPR quality score of the results (at block 212).

When the electronic processor 18 determines that the LPR confidence score is below a threshold score, the electronic processor 18 adjusts the imaging, or "tuning" parameters 30 of the camera 10 using, for example, the predictive model 34 (at block 216), and repeats the steps of block 208 through 216. When the electronic processor 18 determines that the LPR confidence score meets or exceeds the threshold score, the method 200 is complete (at block 220). In some instances, when the LPR confidence score meets or exceeds the threshold score, the electronic processor 18 repeats a portion of the steps of the method 200. For example, the electronic processor 18 may determine LPR confidence scores for images later captured using the camera 10 (at block 208), and adjust the imaging parameters 30 when the LPR confidence score falls below the threshold score (at block 216).

Figure 5:
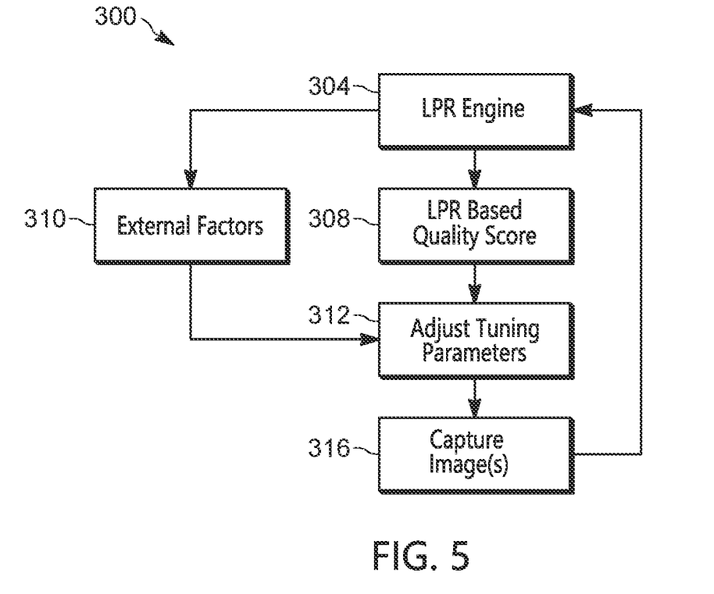
FIG. 5 illustrates a method for updating a set of imaging parameters for performing license plate recognition on a captured image.

FIG. 5 illustrates an example use-case method 300, implemented using, for example, the electronic processor 18, for updating a set of imaging parameters 30 for performing license plate recognition on a captured image. The method 300 includes performing LPR on a captured image (at block 304), and determining a LPR confidence score, or "quality score," based on a result of the LPR (at block 308). In some instances, for example during a training period of the predictive model 34, the electronic processor 18 determines the score based on, for example, the percentage of characters of the license plate correctly identified using the object recognition program 32. In some instances, the electronic processor 18 determines partial scores for incorrect characters. For example, when the number "0" is incorrectly identified using the object recognition program 32 as the letter "O", the electronic processor 18 may assign a partial score for that character because of the similarity in shape of the number "0" and the letter "O." In contrast, when the number "0" is incorrectly identified as the letter "A", the electronic processor 18 may not assign a partial score, or assign a lesser partial score, for that character because of the dissimilarity in shape of the number "0" and the letter "A." In some instances, the electronic processor 18 determines the confidence score based on individual confidence scores returned by an OCR function of the object recognition program 32.

The method 300 also includes determining the set of external factors (at block 310) and adjusting the imaging parameters 30 of the captured image based on an LPR confidence score (e.g., a predicted LPR confidence score predicted by the electronic processor 18, with the predictive model 34, based on the imaging parameters 30 and the set of external factors) and the set of external factors (at block 312). The electronic processor 18 may update the imaging parameters 30 using, for example, the predictive model 34. The method 300 further includes capturing one or more additional images using the updated imaging parameters 30 (at block 316). After capturing one or more additional images using the updated imaging parameters 30, the electronic processor 18 may repeat the steps of the method 300.

In the foregoing specification, specific examples have been described. However, one of ordinary skill in the art appreciates that various modifications and changes can be made without departing from the scope of the claimed subject matter. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Additionally, unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations, for example, collectively. To reiterate, those electronic processors and processing may be distributed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An imaging system comprising:
   an image sensor; and
   an electronic processor in communication with the image sensor and configured to:
   determine a set of imaging parameters; and
   for each iteration included in an iteration set, update the set of imaging parameters by:
   receiving an image captured by the image sensor using the set of imaging parameters;
   executing an object recognition program to detect an object of interest in the image;
   determining an object recognition confidence score;
   determining a set of external factors based on the image and/or information from a second sensor;
   linking the set of imaging parameters and the set of external factors to the object recognition confidence score; and
   training a predictive model distinct from the object recognition program, for updating the set of imaging parameters using the object recognition confidence score, the set of imaging parameters, and the set of external factors.

2. The imaging system of claim 1, wherein
   the iteration set includes a plurality of iteration subsets, and
   the electronic processor is configured to, for each iteration subset,
   determine a selected imaging parameter to update, and
   update the selected imaging parameter based on the object recognition confidence score.

3. The imaging system of claim 2, wherein the electronic processor is configured to determine the selected imaging parameter using the predictive model.

4. The imaging system of claim 2, wherein the electronic processor is configured to determine a number of iterations included in each iteration subset using the predictive model.

5. The imaging system of claim 1, wherein the set of imaging parameters includes at least one selected from the group consisting of: aperture settings, shutter speed settings, focus settings, illumination settings, image capture timing settings, and lens cleaning settings.

6. The imaging system of claim 1, wherein the set of external factors include at least one selected from the group consisting of: ambient light information, a weather condition, a reflectivity of the object of interest, a location of the object of interest in the image, and a speed of the object of interest.

7. The imaging system of claim 1, wherein the object of interest is a license plate, and performing object recognition includes at least one selected from the group consisting of: detecting a location of the license plate in the image, performing optical character recognition ("OCR") on a set of characters included in the license plate, and determining a state or region associated with the license plate.

8. The imaging system of claim 1, wherein the electronic processor is configured to determine the set of imaging parameters using the predictive model.

9. The imaging system of claim 1, wherein the electronic processor is configured to determine the set of imaging parameters using automatic camera tuning.

10. A method performed in an imaging system, the method comprising:
    determining a set of imaging parameters; and
    for each iteration included in an iteration set, updating the set of imaging parameters by:
    receiving an image captured by an image sensor using the set of imaging parameters;
    executing an object recognition program to detect an object of interest in the image;
    determining an object recognition confidence score;
    determining a set of external factors based on the image and/or information from a second sensor;
    linking the set of imaging parameters and the set of external factors to the object recognition confidence score; and
    training a predictive model distinct from the object recognition program, for updating the set of imaging parameters using the object recognition confidence score, the set of imaging parameters, and the set of external factors.

11. The method of claim 10, wherein
    the iteration set includes a plurality of iteration subsets; and
    the method further comprises:
    for each iteration subset, determining a selected imaging parameter to update, and
    updating the selected imaging parameter based on the object recognition confidence score.

12. The method of claim 11, wherein the selected imaging parameter is determined using the predictive model.

13. The method of claim 11, further comprising:
    determining a number of iterations included in each iteration subset using the predictive model.

14. The method of claim 10, wherein the set of imaging parameters includes at least one selected from the group consisting of: aperture settings, shutter speed settings, focus settings, illumination settings, image capture timing settings, and lens cleaning settings.

15. The method of claim 10, wherein the set of external factors include at least one selected from the group consisting of: ambient light information, a weather condition, a reflectivity of the object of interest, a location of the object of interest in the image, and a speed of the object of interest.

16. The method of claim 10, wherein the object of interest is a license plate, and performing object recognition includes at least one selected from the group consisting of: detecting a location of the license plate in the image, performing optical character recognition ("OCR") on a set of characters included in the license plate, and determining a state or region associated with the license plate.

17. The method of claim 10, wherein the set of imaging parameters is determined using the predictive model.

18. The imaging system of claim 10, wherein the set of imaging parameters is determined using automatic camera tuning.

19. A non-transitory computer readable medium storing a program that, when executed by an electronic processor, causes the electronic processor to perform a set of operations comprising:
   determining a set of imaging parameters; and
   for each iteration included in an iteration set, updating the set of imaging parameters by:
      receiving an image captured by an image sensor using the set of imaging parameters;
      executing an object recognition program to detect an object of interest in the image;
      determining an object recognition confidence score;
      determining a set of external factors based on the image and/or information from a second sensor;
      inking the set of imaging parameters and the set of external factors to the object recognition confidence score; and
      training a predictive model distinct from the object recognition program, for updating the set of imaging parameters using the object recognition confidence score, the set of imaging parameters, and the set of external factors.

20. The non-transitory computer readable medium of claim 19, wherein the set of imaging parameters includes at least one selected from the group consisting of: aperture settings, shutter speed settings, focus settings, illumination settings, image capture timing settings, and lens cleaning settings.

\* \* \* \* \*